US005619789A

United States Patent [19]

Chung

[11] Patent Number: 5,619,789

[45] Date of Patent: Apr. 15, 1997

[54] SPRING CLIP FOR SHEET MATERIAL AND APPLICATOR THEREFOR

[76] Inventor: Jin W. Chung, 13514 Cedar Creek La., Silver Spring, Md. 20904

[21] Appl. No.: 314,640

[22] Filed: Sep. 29, 1994

[51] Int. Cl.[6] .............................. B23Q 7/10; B23P 11/00

[52] U.S. Cl. ........................ 29/814; 29/811.2; 29/243.56; 24/67 R; 24/67.9

[58] Field of Search .................................. 24/67 R, 67.3, 24/67.5, 67.7, 67.9; 29/809, 811.2, 814, 243.5, 243.56

[56] References Cited

U.S. PATENT DOCUMENTS

| | | | |
|---|---|---|---|
| Re. 27,591 | 3/1973 | Munse | 29/243.56 |
| 360,960 | 4/1887 | Hamilton . | |
| 487,960 | 12/1892 | McDonald, Jr. . | |
| 913,876 | 3/1909 | Cohen . | |
| 1,150,073 | 8/1915 | Spengler . | |
| 1,245,936 | 11/1917 | Loveland . | |
| 1,314,818 | 9/1919 | Lea . | |
| 1,590,682 | 6/1926 | Hart . | |
| 2,176,116 | 10/1939 | Baetzhold et al. | 29/809 |
| 2,259,505 | 10/1941 | Wisdom | 24/67.9 |
| 2,271,734 | 2/1942 | Dunham | 24/67.3 |
| 2,385,209 | 9/1945 | Joyce . | |
| 2,999,569 | 9/1961 | Wilson . | |
| 3,236,381 | 11/1966 | Wooge . | |
| 3,430,326 | 3/1969 | Geisler et al. | 29/809 |
| 3,543,376 | 12/1970 | Lovell et al. | 29/814 |
| 3,648,334 | 3/1972 | Swalm . | |
| 3,742,577 | 7/1973 | Buttriss | 29/811.2 |
| 3,914,824 | 10/1975 | Purdy . | |
| 4,332,060 | 6/1982 | Sato . | |
| 4,353,157 | 10/1982 | Sato | 29/243.56 |
| 4,735,438 | 4/1988 | Demarest, Jr. | 24/67.3 |
| 4,791,707 | 12/1988 | Tucker | 29/243.56 |
| 4,899,438 | 2/1990 | Muller et al. | 29/811.2 |
| 4,996,755 | 3/1991 | Sato | 29/243.56 |
| 5,119,533 | 6/1992 | Sato | 29/243.56 |
| 5,136,768 | 8/1992 | Sato | 29/243.56 |
| 5,152,423 | 10/1992 | Tseng | 29/243.56 |

FOREIGN PATENT DOCUMENTS

| | | | |
|---|---|---|---|
| 645639 | 3/1993 | Australia | 24/67.9 |
| 868055 | 12/1941 | France | 24/67.5 |
| 4109082 | 9/1992 | Germany | 24/67 R |
| 13383 | 6/1914 | United Kingdom | 24/67.5 |
| 744958 | 2/1956 | United Kingdom | 24/67.3 |

*Primary Examiner*—David P. Bryant

[57] ABSTRACT

A spring clip in the form of a generally U-shaped clamp, the clamp comprising a pair of holding members for resiliently gripping sheets of paper or the like inserted therebetween. The holding members having forward or leading ends extending outwardly, folded back over themselves with J-shaped hook cross-section, and formed as outer lips portions of clamping jaws with the openings of the J-shaped hooks facing the rear ends of the holding members. The openings of the J-shaped hooks provide access to which leading guides of special opening applicator are engaged to open the normally closed clamping jaws. In contrast to the conventional spring clips of the similar type, the clip disclosed herein has no levers or widthwise, ear-like side projections for opening the clip is thus advantageous over the prior art devices because of its simplicity and ease in use.

8 Claims, 7 Drawing Sheets

SPRING CLIP FOR SHEET MATERIAL AND APPLICATOR THEREFOR

BACKGROUND OF THE INVENTION

The invention disclosed and claimed herein relates to a new and improved spring clips for holding or retaining sheets of paper or documents together. Clips for fastening papers or documents are well known in the prior art. They come in different forms, shapes, and sizes. One popular type of spring clips comprise pairs of flat jaw holding or gripping plates having forward edges or leading lips, which press against each other resiliently. A pair of levers are provided at the leading edges. A person desiring to use such a clip, uses the levers to spread or pry the leading edges away from each other whereby paper may be inserted therebetween or removed therefrom. Another form of such spring clips comprises ear-like side extensions and requires a special opening device having opening guides, rails, or the like which are inserted between adjacent extensions to thereby engage and spread the lips of the gripping plates. The structure of these types of clips is such that only the projected extensions of the clip are engaged with the opening guides so that in the case of relatively small or moderate size clips of this type, the clips may disfigure or permanently bend the projections, especially if they are used repeatedly. Moreover, such extensions may not be suitable for relatively larger clips. Also, in the case of such clips with side projections, the production thereof requires the inconvenience of an extra cutting step and the removal and wasteful disposal of material cut from rectangular blanks or sheets. Where the spring clip is made with levers for spreading the gripping plates, a substantial force is often required to open even relatively moderate size spring clips of this type. Moreover, such levers tend to prevent the clipped sheets from being turned up.

In a search of the prior art, the United States patents listed below were noted as being of interest:

| U.S. Pat. No. | Patentee | Year | Class/Subclass |
|---|---|---|---|
| 360,960 | Hamilton | 1887 | 24/67.9 |
| 487,960 | McDonald, Jr. | 1892 | 24/67.5 |
| 522,257 | McDonald | 1894 | 24/67.5 |
| 913,876 | Cohen | 1909 | 24/67.5 |
| 1,150,073 | Spengler | 1915 | 24/259 |
| 1,245,936 | Loveland | 1917 | 24/67.9 |
| 1,314,818 | Lea | 1919 | 24/67.9 |
| 1,590,682 | Hart | 1926 | 24/255 |
| 2,385,209 | Joyce | 1945 | 24/259 |
| 2,999,569 | Wilson | 1961 | 24/259 |
| 3,286,381 | Wooge | 1966 | 24/67.5 |
| 3,648,334 | Swaim | 1972 | 24/259 |
| 3,914,824 | Purdy | 1975 | 24/67.9 |
| 4,332,060 | Sato | 1982 | 24/67.9 |

SUMMARY OF THE INVENTION

The present invention was conceived to overcome the problems encountered in using the prior art type clips and as discussed above.

Another object of this invention is to provide an improved spring clip neither having nor requiring any opening levers, lateral extensions, or widthwise projections for an opening mechanism.

Accordingly, another object of this invention is a method of making a new and improved spring clip requiring no opening levers, no side projections or extensions of the prior art devices.

A further object of this invention is to provide a clip opening applicator, disclosed and designed to accommodate and facilitate use of a spring clip having no side extensions for opening the clip.

The present invention provides a spring clip requiring no opening levers and having no side projections or ear-like extensions as required by the prior art clips, and is thus easier, simpler, and more economical to produce, since there is no material wasted as that which is removed and discarded in the production of clips with ear-like projections.

The present invention provides a clip comprising a U-shaped clamp with a pair of opposed jaws at the opening end thereof with two outer lips extending along the clamp jaws, and with inner lip portions of the leading edges for holding paper or other material inserted therebetween and pressing against each other resiliently. The outer lips are extended farther out and folded over outwardly, forming a J-shaped hook like portion when viewed from a side thereof, wherein bases of the J-shaped hooks at both side edges of the outer lips are cut and removed from the side edges to form a slit at both sides of the outer lips to receive and engage the removable opening guides of the clip applicator to open the outer lips. The removable opening guides of the clip applicator are engaged in the J-shaped hooks of the upper and lower outer lips to open the outer lips by traveling forward on prearranged tracks, or the removable separating guides are engaged in the lower slits at the both ends of the lower lip and the upper removable opening guide is engaged in the upper J-shaped hook of the upper lip to open the upper and lower lips as the guides move forward on prearranged tracks. The clip applicator thus has clip spreading means including upper and lower spreading or opening guides engaged the clip outer lips or hooks and prearranged tracks on which the spreading guides travel forward. The gap between the upper and lower tracks gradually become widened and the spreading guide pins move farther apart as they travel forward on the tracks. Consequently, the clip jaws open because the outer lips of the clip are engaged on the spreading or opening guide pins. The leading opening guides of the clip applicator are snugly or firmly engaged in the openings of the opposed outer lips and can be readily removed. The shape of the opening guides are generally in the form of a flat bar-like pin or rod with rectangular or other suitable cross-sections for engagement in the opening of the outer lips, while the guides extend beyond the width of the clip. Therefore, both ends of each guide pin are extended laterally, as a bicycle handle, and the extended ends are engaged within guiding tracks or channels so that two opposed leading guides move away from each other, following the paths of the guide tracks or channels, to open the jaws as they travel forward or spread the jaws apart to open them. In contrast to the existing clips with ear-like projections on which separating forces are applied to open the jaws, with the leading guides applying full forces on the lips and, thus, to the flat body portions of the clip directly to spread the opposed lips.

At the end of forward travel, the clip jaws are opened fully and paper or the like can be inserted therebetween. When the guide pins are in fully open positions and paper is inserted or loaded, the pins are then disengaged from the outer lips of the clip and the clip will then firmly grip and hold the inserted material. The leading edges which hold the paper or the like material may be formed with roughened surfaces or dimpled to enhance the grip imposed thereby on paper inserted therebetween. Paper or other material between the jaws of the clip may be withdrawn therefrom by using an applicator tool or by holding the clip between two fingers of one hand and pulling the paper out with the other hand.

BRIEF DESCRIPTION OF THE DRAWINGS

The objects set forth above and other advantages and benefits of this invention, will be readily appreciated by the reader upon referring to the appended drawings in which.

Corresponding parts of successive prior art devices illustrated and discussed herein are designated by the same reference numbers increased by ten.

DISCUSSION OF THE PRIOR ART DEVICES

Figure 1A:
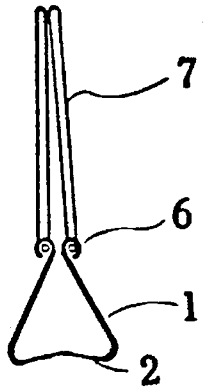
( PRIOR ART ) FIG. 1A
FIG. 1A is a side elevational view of a prior art spring clip.
Figure 1B:
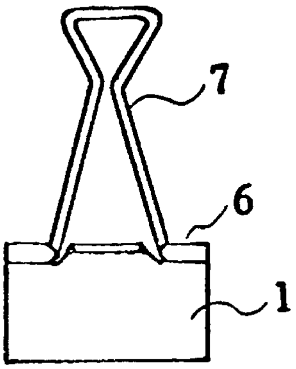
( PRIOR ART ) FIG. 1B
FIG. 1B is a top plan view of the clip in FIG. 1A.

FIGS. 1A and 1B show side and top views of a prior art spring clip comprising a pair of flat clamping, gripping, or holding members 1 and a bridge or bight connecting portion 2 made from an integral strip of resilient material providing resilient U-shaped jaws. The leading or forward edges of the opening are normally closed at the lips 6, which press against each other to hold sheets of paper therebetween. Lips 6 extend outwardly from the gripping portions thereof to accommodate a pair of levers 7. These levers 7 are pivotally disposed inside the outwardly turned lips 6 and are generally made from wire. Levers 7 are turned backward to the opening position, pressed against the flat faces 1 and the free ends of the levers 7 are then squeezed or pressed between two fingers toward each other to open the clip. The bight or bridge connecing portion 2 of the clip acts as a pivot point for the levers and the clip jaws will be opened for insertion or removal of sheets of paper, which are gripped thereby or withdrawn from between the flat clamping faces 1.

Figure 2:
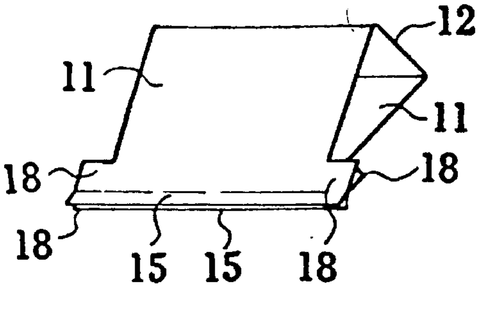
( PRIOR ART ) FIG. 2
FIG. 2 is a view in perspective of another prior art spring clip.
Figure 3:
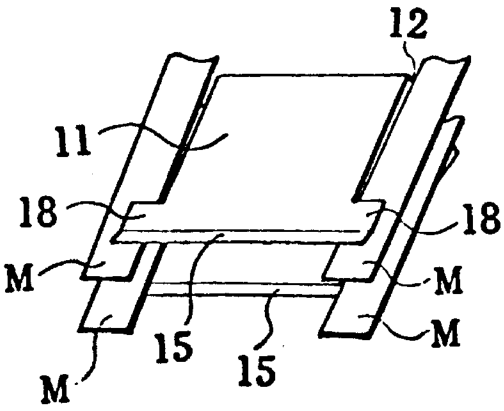
( PRIOR ART ) FIG. 3
FIG. 3 is a view in perspective of the spring clip in FIG. 2 with ear-like projections and opening guide means extending therebetween.

The prior art spring clip FIGS. 2 and 3, as may be seen in FIG. 3, is engaged in a clip opening device of the prior art. The principal difference between the clips of FIGS. 1 and 2 is that the clip opening levers 7 of the FIG. 1 embodiment are omitted from the FIG. 2 embodiment, so that the latter must be opened by a clip opening device as in FIG. 3. The prior art clip of FIG. 2 is formed with a pair of ear-like projections 18 extending laterally or widthwise from the side edges of each pressing face 11 to facilitate opening with the prior art tool. To open the clip in FIG. 2, these ear-like projections 18 interengage with opening guides M of the opening tool or clip applicator as depicted in FIG. 3. Lips 15 in FIG. 2 are bent slightly outwardly so that ear-like projections 18 can be readily interengaged with opening guides M. This clip applicator can not be used to remove sheets of paper from this prior art clip, but by holding this clip in one hand one can pull sheets of papers out with the other hand.

DETAILED DESCRIPTION OF THE PREFERRED EMBODIMENTS

Figure 4:
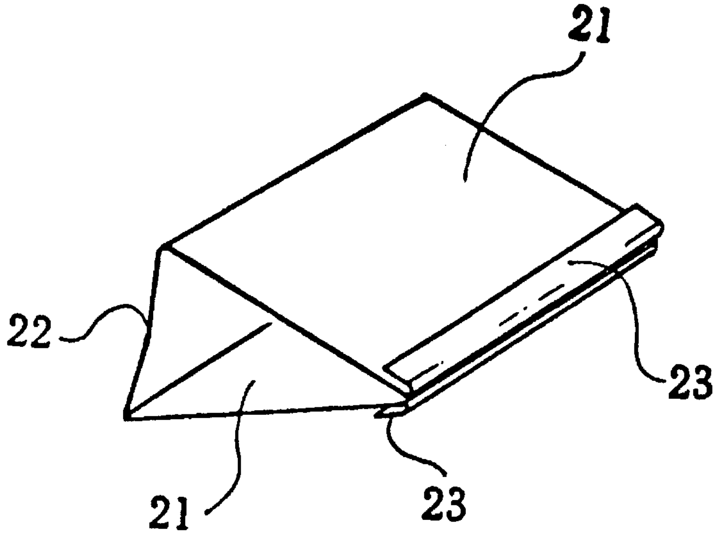
FIG. 4 shows a clip with the folded-out lips in perspective.
Figure 5:
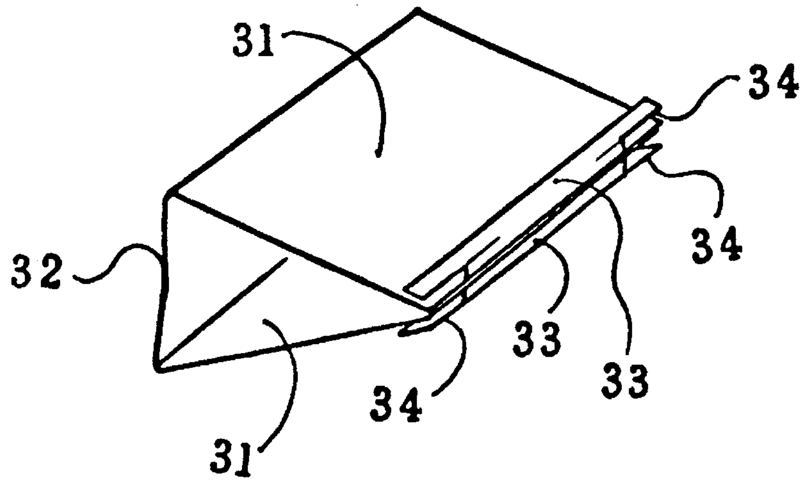
FIG. 5 shows one embodiment of the present invention in perspective.
Figure 6:
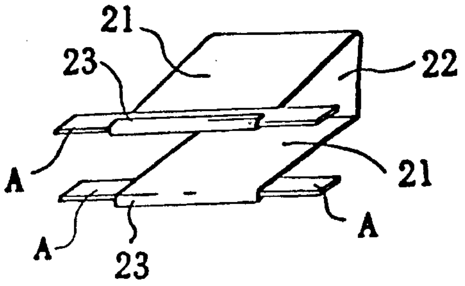
FIGS. 6 and 7 show the clips of FIGS. 4 and 5, respectively, in perspective, while opened by guide pins.
Figure 7:
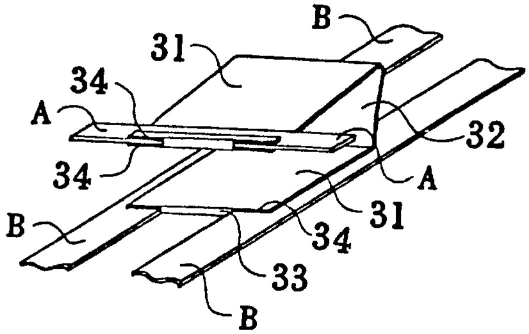
Figure 8:
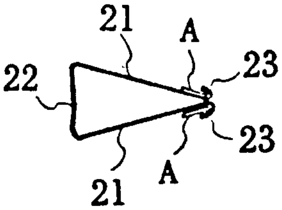
FIGS. 8 and 9 show side elevational views of the clips in FIGS. 4 and 5, respectively, in perspective, with guide pins interengaged therewith.
Figure 10:
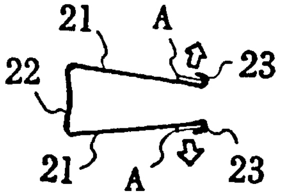
FIGS. 10 and 11 show side elevational views of the clips in FIGS. 4 and 5, respectively, spreaded in open condition by guide pins according to the present invention.

Turning now to FIG. 5 one embodiment of my new and improved clip appears in the form of a spring clip which is made from integral blank strips of resilient material, by bending a strip to form a pair of flat holding portions 31 and a rear bight or connecting wall 32 bridging between the rear ends of flat holding portions 31, which converge from the their rear ends toward their front ends, where lips 33 resiliently press against each other. The spring clip, as can be seen, includes neither the levers of the the prior art clip of FIGS. 1A and 1B nor the ear-like projections of the prior art clip of FIGS. 2 and 3 to open the holding portions 31. The two flat holding or gripping portions 31 of this form of the present invention are extended and folded over outwardly to form outer lips 33 whereby spreading or opening elements such as flat pins, flat rods A or the like in FIGS. 6 and 8 can be extended or latched within the spaces between the flat holding members 31 and the outer lips 33 through the opening of such outer lips 33. Portions of the bight adjacent to both sides 34 of the outer lips 33 are cut and removed from between the base of outer lips 33 and the flat holding members 31, thereby providing slits 34, through which the flat sliding guide tracks B are engaged as shown in FIG. 7 and the guide pin A is engaged in the opening of the upper outer lip 33. To simplify the terminology, the opening or spreading members of flat pins or rods will hereinafter be referred to as guide pins and the sliding guide tracks B as guide track. In FIGS. 6 and 8 which show perspective and side views of the clip of FIG. 4, the leading guide pins A may be seen to be engaged in the opening between the flat holding members 21 and the outer lips 23. FIGS. 8 and 10 show the clip of FIG. 4 in closed and open positions, respectively, where guide pins A are pulling the leading edges of the flat holding members apart from each other.

Figure 9:
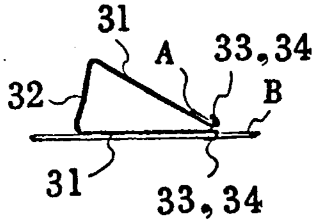
Figure 11:
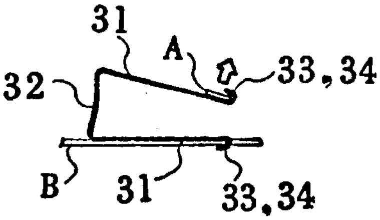

FIGS. 7 and 9 which show perspective and side views of the clip of FIG. 5 with the lower slits 34 of the clip engaged in the lower sliding tracks B and the upper guide pin A engaged in an opening between the upper lip 33 and the upper flat holding member 31. FIGS. 9 and 11 show the clip of FIG. 5 in closed and open positions, respectively, where the upper guide pin A is pulling the leading edge of the upper flat holding member 31 apart from the lower lip and the lower flat sliding tracks B are holding the lower holding member 31 of the clip down. The clip in FIG. 5 travels along the upper tracks when its open slits 34 are engaged along the bottom flat sliding guiding tracks B and the upper guide pin A is engaged with the upper lip 33.

The clips of the present invention shown in FIG. 5, as described above, have no other parts such as levers 7 of the prior art clip of FIG. 1 or ear-like projections 18 of the prior art clip of FIG. 2, and is made from a rectangular strip or blank with a minimum of waste of construction materials in contrast to lost of material when making clips with ear-like projections 18 of the prior art clip of FIG. 2.

FIGS. 12A–19 illustrate various steps in methods for spreading or opening the spring clips of the present invention and various views of tools or applicators for opening clip of the present invention.

Figure 12A:
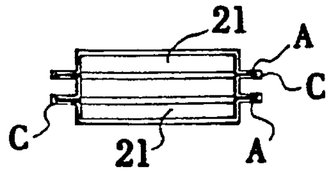
FIGS. 12A, 12B, and 12C show front, top, and side views, respectively, of a step in opening the spring clip of FIG. 4 with an opening applicator according to the present invention.
Figure 12B:
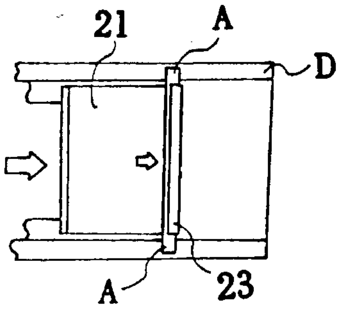
Figure 12C:
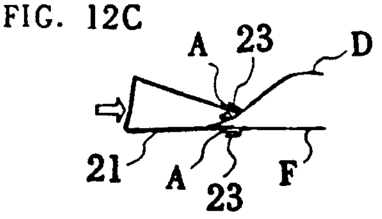

FIGS. 12A, 12B, and 12C show the front, top, and side views of a clip of FIG. 4, where upper and lower guide pins A are engaged in the opening of the outer lip 23 sliding and traveling on a curved upper track D and the lower flat track F, respectively. Both ends of the upper and lower guide pins sit and slide on the lower faces of respective channels C following the tracks D and F, wherein the channel C provides guidance for the guide pins A and maintains guide pins A within their respective sliding tracks D and F.

Figure 13A:
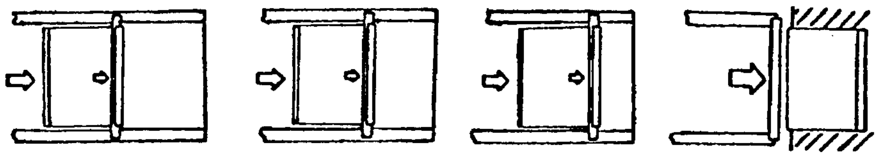
FIGS. 13A and 13B show top and side views, respectively, of the steps in opening the spring clip of FIG. 4 with an opening applicator according to the present invention.
Figure 13B:
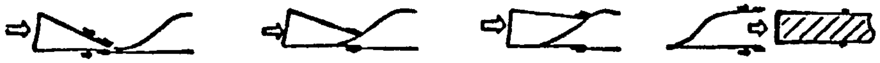

FIGS. 13A and 13B illustrate top and side views of the separating sequence of the leading edges for the first embodiment shown in FIG. 4. The leading guide pins A are engaged in the openings of the outer lips 23 and both ends of the pins A are sliding on the tracks D and F as shown in FIG. 12C. When the guide pins A and the clip are pushed forward, the upper and lower lips of the first embodiment is progressively separated. Toward the end of the tracks D and F the lips are completely separated in full open position and the sheets of paper or the like can be inserted between the opening of the jaws.

Figure 14A:
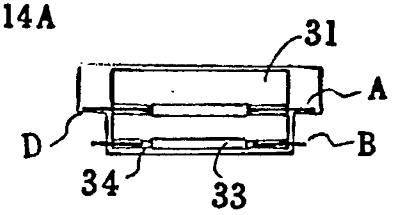
FIGS. 14A, 14B, and 14C show front, top, and side views, respectively, of a step in opening the spring clip of FIG. 5 with an opening applicator according to the present invention.
Figure 14B:
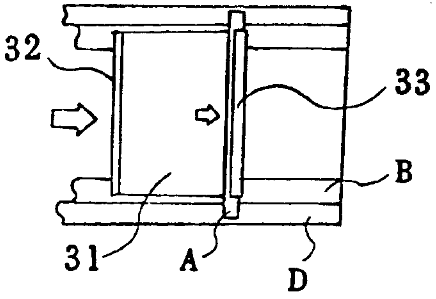
Figure 14C:
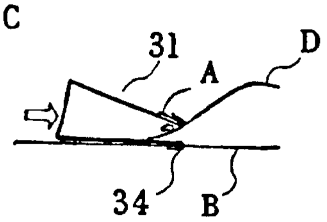

FIGS. 14A, 14B, and 14C show front, top, and side views of the first embodiment of FIG. 5, where the upper guiding pin A is engaged in the opening of the outer lip 33 and the slit 34 of the bottom lip 33 is engaged on the flat sliding track B, where both ends of the upper guiding pin A is sliding on the upper face of the upper track D. Since the lower sliding track B is engaged in the opening slits 34 of the lips 33, the top view in FIG. 14B shows the lower sliding track B in the inside of the upper track D.

Figure 15A:
FIGS. 15A, 15B, and 15C show front, top, and side views, respectively, of the steps in the opening motions with the lower slits of the clip in FIG. 5 sliding on a flat guide.
Figure 15B:
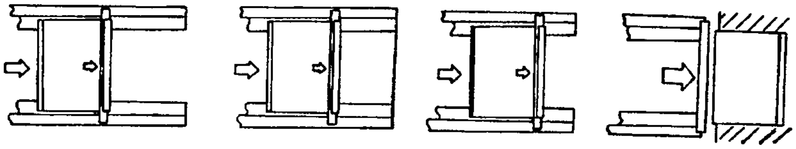
Figure 15C:

FIGS. 15A, 15B, and 15C illustrate front, top, and side views of the separating sequence of the leading edges for the clip shown in FIG. 5. When the upper guide pin A and the lower sliding track B are engaged as described above in connection with FIGS. 14A, 14B, and 14C, the upper guide pin A pulls the upper lip of the upper holding member away from the lower lip which is held down by the lower slits 34 while sliding on the lower track B shown in FIG. 14C. Consequently, the leading edges of the two flat holding members of the clip shown in FIG. 5 are progressively separated and eventually open the jaws in full open position toward the end of the tracks at which the sheets of paper or the like can be inserted between the opening of the jaws.

Figure 16A:
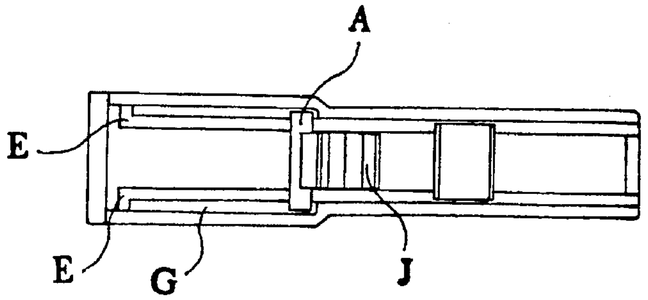
FIGS. 16A and 16B show top and side views, respectively, of the clip of FIG. 5 engaged in the push-sliding opening applicator with the bottom slits of the clip lip engaged on curved bottom guides in the present invention.
Figure 16B:
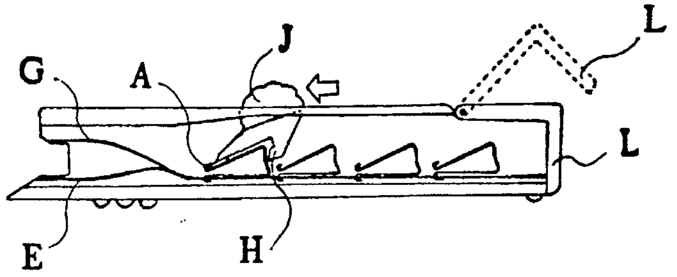
Figure 17A:
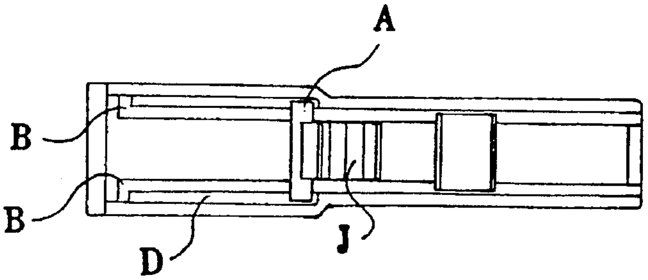
FIGS. 17A and 17B show top and side views, respectively, of the clip of FIG. 5 engaged in a push-sliding opening applicator with the bottom slits of the clip lip engaged on the flat bottom guides in the present invention.
Figure 17B:
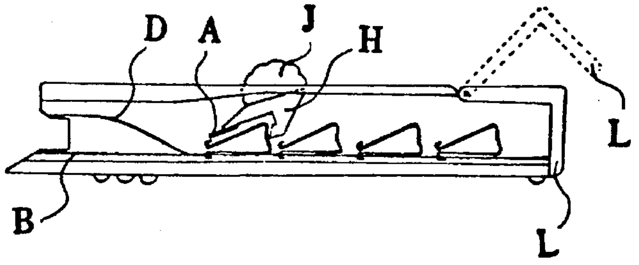
Figure 19:
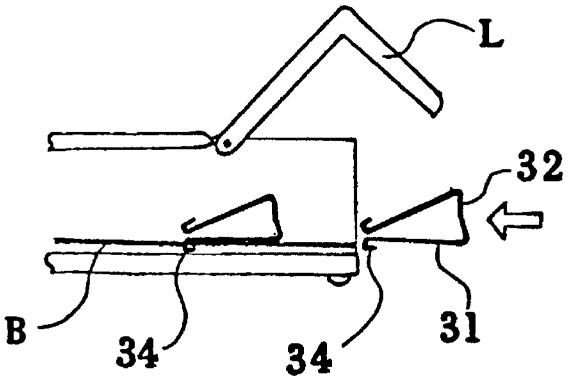
FIGS. 19 shows an arrangement for explaining the operation of the applicator in FIGS. 16A through 18B of the present invention demonstrating an end loading of the clip of FIG. 5.

FIGS. 16A, 16B, 17A, and **17*b* illustrate an artistic presentation of top and side views of the push-sliding type applicators using the curved and flat bottom tracks, respectively. The clips are loaded from the back of the applicators. In order to load the clips into the applicator, the rear cover L should be lifted from its pivot hinge, and the bottom slits of the clips in FIG. 5 are engaged onto the lower sliding guide track B at the rear opening as shown in FIG. 19. Using a thumb, one can align the guide driver J so that the guide pin A at the front end of the driver J can be engaged into the opening of the clips's upper lip while a driver head H attached to the driver J can be engaged at the rear end of the clip. As the driver is pushed forward by the thumb, the header H pushes the clip forward and the guide pin A travels on the track G with the lower slits of the clip sliding on the lower curved track E. FIGS. 17A and 17B are similar to FIGS 16A and 16B**, respectively, except that the lower sliding track is a flat track B.

Figure 18A:
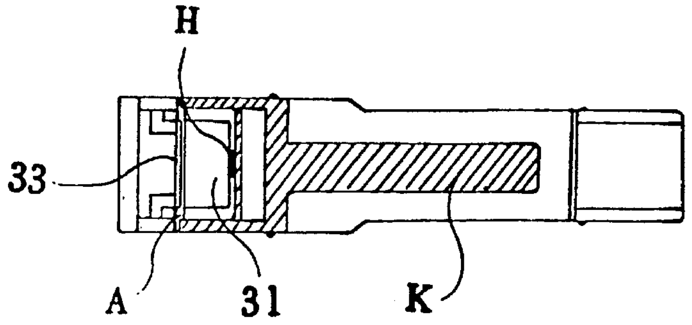
FIGS. 18A and 18B show top and side views, respectively, of the clip of FIG. 5 engaged in a push-down opening applicator in the present invention.
Figure 18B:
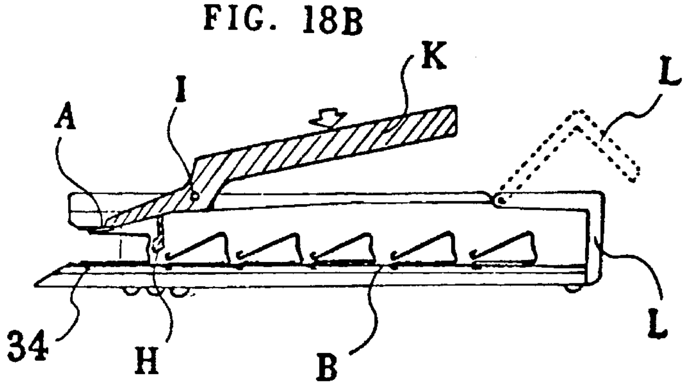

FIGS. 18A and 18B show artistic top and side views of another applicator device employing lever principles of the push-down type arrangement. This applicator is particularly advantageous for the larger clips, which may require considerable force to open. In a manner similar to the push-sliding type applicator illustrated in FIGS. 16A, 16B, 17A, and 17B, the driver head H and the guide pin of the present push-down type applicator are attached to the driver, which serves as a part of the push-down lever K. When the guide pin A and the slits are engaged on the tracks, the pin A and the head H travel forward on the tracks if the handle K is pushed down about its hinge I. In FIGS. 16A through 19, the end-loaded clips in the applicator can be pushed forward toward the front end of the loading zone by either manually tilting the loaded applicator or pushing the clips forward.

While the present invention has been described above in conjunction with the prefered specific embodiments shown in the accompanying drawings, it should be obvious to those skilled in the art and understood that various changes may be made to the disclosed structure without departing from the scope of the invention which is not to be considered as being limited to what is shown in the drawings and described in the specification.

I claim:

1. A spring clip in the form of a generally U-shaped clamp for holding sheet material, comprising:

two substantially flat holding members, each holding member including parallel side edges, a front end, and a rear end opposite said front end; and a rear bight joining member;

said rear bight joining member being connected to and between said rear ends of said holding members, and resiliently biasing said front ends of said holding members together with a predetermined clamping force such that said front ends are adjacent to each other;

each of said front ends of said holding members being folded over outwardly away from its corresponding holding member and toward said rear bight joining member, forming a J-shaped outer channel including an inner side portion and an opposite outer side portion connected by a base portion, said inner side portions adapted for contacting said sheet material when said sheet material is inserted within said clip;

each of said base portions of said channels including cuts therein at opposite ends thereof which extend for a predetermined distance from the side edges of its corresponding holding member, forming slits in each base portion at said opposite ends thereof.

2. The spring clip as claimed in claim 1, wherein the inner side portions of said J-shaped channels are dimpled to improve the gripping action of the clip on the sheet material.

3. The spring clip as claimed in claim 1, wherein said clip is formed from a resilient sheet of metal.

4. The spring clip as claimed in claim 1, in combination with a clip applicator device, said clip applicator device comprising:

upper and lower guide pins removably engageable with respective upper and lower J-shaped channels of said clip; and a pair of guide tracks disposed on each side of said clip, each pair of guide tracks including a lower track and an upper track which diverges from said lower track, the ends of said upper guide pin being slidable along said upper tracks, and the ends of said lower guide pin being slidable along said lower tracks;

wherein said clip is applied to said sheet material by engaging said upper and lower guide pins within respective upper and lower J-shaped channels of said clip, and sliding said upper and lower guide pins along their respective upper and lower guide tracks, such that said upper and lower guide pins slide along the diverging tracks, and said front ends of said holding members are separated sufficiently to permit insertion of said sheet material therebetween.

5. The spring clip as claimed in claim 1, in combination with a clip applicator device, said clip applicator device comprising:

a channel-shaped clip chamber for storing said clip along with a plurality of other identical clips, each clip being oriented within said clip chamber with one of said J-shaped channels in an upper position and the other of said J-shaped channels in a lower position;

an upper guide pin removably engageable with the upper J-shaped channel of said clip;

a pair of guide tracks disposed on each side of said clip chamber, each pair of guide tracks including a lower track and an upper track which diverges from said lower track, said upper guide pin slidable along said upper tracks, and said lower tracks being engageable with said slits in said lower J-shaped channel of said clip; and a driver reciprocatively slidable within said clip chamber for driving said clip through said clip chamber and out a front end of said clip chamber, said driver including a front portion attached to said upper guide pin, a rear portion for contacting the rear bight joining member of said clip, and a head projecting from said clip chamber for actuating said driver;

wherein said clip is applied to said sheet material by manipulating said head of said driver to engage said upper guide pin within said upper J-shaped channel of said clip and to contact the rear bight joining member of said clip with said rear portion of said driver, and sliding said driver forward within said clip chamber to drive said clip through said clip chamber such that said upper guide pin slides along the upper tracks, and said front ends of said holding members are separated sufficiently to permit insertion of said sheet material therebetween.

6. The spring clip in combination with a clip applicator device as claimed in claim 5, wherein said clip chamber includes an opening at a rear end thereof through which clips can be loaded into said clip chamber with the lower tracks engaged within the slits in the lower J-shaped channel of each clip.

7. The spring clip as claimed in claim 1, in combination with a clip applicator device, said clip applicator device comprising:

a channel-shaped clip chamber for storing said clip along with a plurality of other identical clips, each clip being oriented within said clip chamber with one of said J-shaped channels in an upper position and the other of said J-shaped channels in a lower position:

an upper guide pin removably engageable with the upper J-shaped channel of said clip;

a lower guide track disposed on each side of said clip chamber, said lower guide tracks being engageable with said slits in said lower J-shaped channel of said clip; and a driver for driving said clip through said clip chamber and out a front end of said clip chamber and for spreading the front ends of said holding members apart, said driver being hinged to said clip chamber for pivotal movement and including a front portion attached to said upper guide pin, a rear portion for contacting the rear bight joining member of said clip, and a lever projecting from said clip chamber for actuating said driver;

wherein said clip is applied to said sheet material by applying a force to the lever of said driver to pivot said driver to engage said upper guide pin within said upper J-shaped channel of said clip and to contact the rear bight joining member of said clip with said rear portion of said driver, and to subsequently drive said clip through said clip chamber and separate said front ends of said holding members sufficiently to permit insertion of said sheet material therebetween.

8. The spring clip in combination with a clip applicator device as claimed in claim 7, wherein said clip chamber includes an opening at a rear end thereof through which clips can be loaded into said clip chamber with the lower tracks engaged within the slits in the lower J-shaped channel of each clip.

* * * * *